United States Patent

[11] 3,607,799

[72] Inventors Herbert S. Barbehenn;
  Gerald M. Leszyk; Edward D. Morrison, all of Rochester, N.Y.
[21] Appl. No. 868,988
[22] Filed Oct. 24, 1969
[45] Patented Sept. 21, 1971
[73] Assignee Eastman Kodak Company
  Rochester, N.Y.

[54] PROCESSES FOR GRAFTING VINYL-TYPE COMPOUNDS TO CELLULOSIC MATERIALS
  8 Claims, 1 Drawing Fig.

[52] U.S. Cl. .................................................... 260/17A,
  260/17.46 C
[51] Int. Cl. .................................................... C08f 1/34
[50] Field of Search ........................................ 260/17.4 GC, 17 A, 17 R

[56] References Cited
  UNITED STATES PATENTS
  2,922,768  1/1960  Mino et al. ............... 260/X 17.4
  3,046,078  7/1962  Salsbury et al. .......... 260/X 17.4

FOREIGN PATENTS
884,805  12/1961  Great Britain ............. 260/X 17.4

OTHER REFERENCES

Krassig et al., " Graft Co-Polymerization to Cellulose and Its Derivatives," Adv. Polymer Sci. Vol. 4, pp. 111– 156, (1965)

Huang et al. " Cellulose-Styrene Graft Copolymers Synthesized by Ceric Ion Method," Journal of Applied Polymer Science; Vol. 12, pp. 2,549–2,562, (1968).

Primary Examiner—William H. Short
Assistant Examiner—Robert J. Koch
Attorneys—Walter O. Hodsdon and John T. Lewis

ABSTRACT: It has been found that the age of ceric ion/nitric acid redox catalysts has a significant effect on the degree of reactivity of vinyl compounds (such as, for example, acrylonitrile) with cellulosic materials. Whereas, the catalyst complex apparently loses its efficacy with the passage of time, it has been found that by aging the catalyst complex for a period of at least several hours after it is initially prepared (before the catalyst complex is added to the other reactant), a very high degree of catalyst stability, catalyst predictability and catalyst efficacy results.

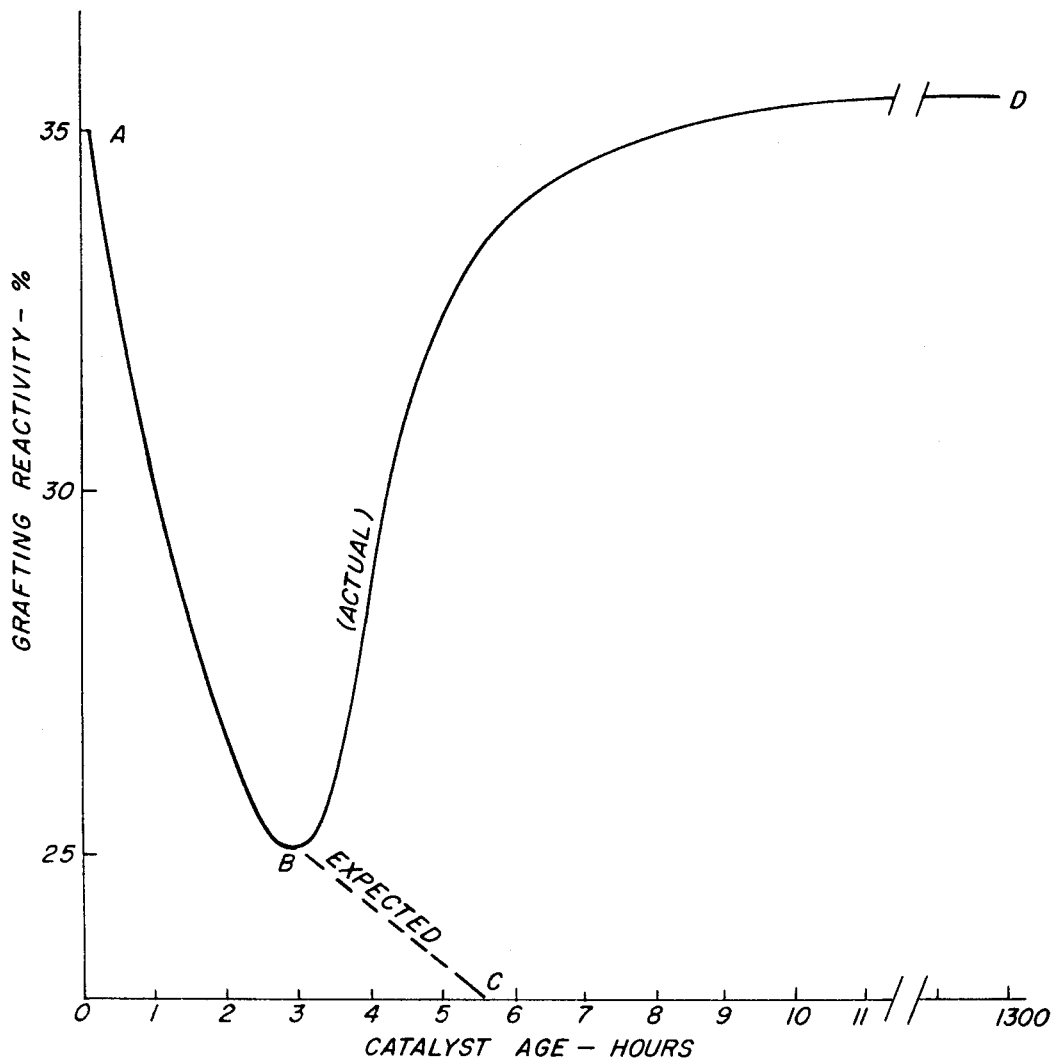

PROCESSES FOR GRAFTING VINYL-TYPE COMPOUNDS TO CELLULOSIC MATERIALS

This invention relates to methods for significantly improving the predictability and controllability of reactions involving the grafting of vinyl-type compounds to cellulosic materials such as cellulose, cellulose esters, cellulose ethers and cellulose ether-esters.

Processes for reacting cellulose, cellulose esters, cellulose ethers and cellulose ether-esters with vinyl or vinylidene monomers which are at least partially soluble in water (which processes are conducted in acidic aqueous media with the aid of one or more redox catalyst such as ceric ions, for example) are well known in the art. For example, a detailed discussion of this type of product and the various monomeric polymerizable compounds that can be used in such processes can be found in U.S. Pat. No. 2,922,768. Although the general reaction of the monomeric polymerizable compounds with cellulosic materials are not discussed in detail in said patent, it has been known heretofore that such vinyl or vinylidene compounds can be grafted to cellulose, cellulose esters and ethers to a certain extent by simply suspending the cellulosic material (containing at least about 1 percent hydroxyl) in water by intermixing powdered cellulosic material with the water, blending into the suspension the monomeric vinyl or vinylidene polymerizable compound(s), and then adding the redox-type catalyst (the reaction being conducted in an acidic medium when ceric ion is the redox catalyst).

Such prior art processes, which involve "grafting" reactions of vinyl or vinylidene monomers (and/or polymers) with hydroxyl-containing cellulosic materials have not found wide commercial acceptance to date largely because (a) only relatively small amounts of vinyl-type material could be grafted onto the cellulosic molecules, and (b) the ceric ion-nitric acid-catalyzed grafting reactions have, for some heretofore unexplained reason, been unpredictable with respect to their reactivity, and have therefore been believed commercially impractical. The first of these problems was solved by the discovery that the reactivity of "never-dried" cellulosic material (which has been dissolved, precipitated, and reacted with the vinyl-type material without being dried) is significantly higher than conventional cellulosic reactants. This solution is the subject matter of copending U.S. Pat. application Ser. No. 772,813, filed Nov. 1, 1968.

Regarding the second problem, the unpredictable nature of the graft reaction is illustrated by a series of experiments in which all of the obvious processing elements (temperature, reactants, time and concentration) were carefully controlled:

| Experiment No. | % Grafted Vinyl Compound |
|---|---|
| 1 | 32.0 |
| 2 | 35.0 |
| 3 | 26.5 |
| 4 | 30.7 |

(This series of experiments involved the reaction of methyl methacrylate with "never-dried" cellulose in the presence of 0.005 molar ceric ion and 0.125 molar $HNO_3$.) After an extensive study, it was discovered that the unpredictability illustrated above was due largely to the fact that the ceric ion-nitric acid catalyst apparently loses its effectiveness very quickly after it is prepared. Thus, in the above experiments, the time elapsed was as follows:

| Experiment No. | Minutes After Catalyst Preparation* |
|---|---|
| 1 | 25 |
| 2 | 0 |
| 3 | 120 |
| 4 | 50 |

* Until the graft reaction was commenced.

This data has been illustrated by that part of the curve in the drawing designated AB. From this data, it appeared that the reactivity of the catalyst system decreased quickly with time after its preparation, and that the only ready answer to this "loss" in reactivity is to make the catalyst "complex" immediately before it is used. From such data as that set out above, it would reasonably be expected that the reactivity of the catalyst would continue to decrease with time (as illustrated by dashed line BC in the drawing). While the use of only freshly prepared catalyst represents one method of controlling the reaction and making it more predictable, such a limitation upon catalyst usage is clearly not very desirable.

However, it has now been discovered that rather than continue to diminish to zero along an "expected" pathway (such as that of line BC in the drawing), for some as yet unexplained reason, the reactivity of the ceric ion-nitric acid catalyst complex, surprisingly, spontaneously reverses its downward degradative direction (shown by curve BD in the drawing), and after a fairly prolonged period of time of about 4 hours (from the time it was initially prepared), actually attains a "reactivity" level which is stable for many hours thereafter, and at a maximum. This high, stable level of reactivity (after at least 4 hours, and preferably after about 5 hours from the time the catalyst complex was prepared) is herein termed the "maximum stable level" for the catalyst system. While the minimum amount of time required to achieve the "maximum stable level" will vary somewhat, depending upon the particular temperature, and probably the particular concentration of ceric and nitrate ions, it can readily be determined. Almost invariably, at temperatures of at least about 35° C., the preferred point (within about 5 percent of the "maximum stable level" for a particular ceric/nitrate catalyst complex) is attained after about 5 hours have elapsed after the initial catalyst complex preparation, and this level is closely maintained for at least about 1,000 hours or more thereafter. In the drawing, the curve ABD represents a series of experiments involving grafting methyl methacrylate onto cellulose, in which series the only variable is the amount of time elapsed after the ceric salt and nitric acid are intermixed initially to form the ceric/nitric acid redox catalyst complex. "Reactivity" is given as maximum percent acrylonitrile grafted onto the cellulose. Similarly shaped curves are obtained by the use of other vinyl-type monomers and/or other cellulosic reactants.

The present invention involves a process for grafting a vinyl-type compound to a hydroxyl-containing cellulosic material in the presence of an acidic ceric acid-nitric acid redox catalyst, in which process conventional manipulative procedures are utilized, with the exception that the grafting reaction of this invention is initiated only after the catalyst has been "aged" until it has passed its "reactivity minimum" (illustrated by point B in the curve of the drawing), and subsequently approached to within about 5 percent of its "maximum stable level."

Except for this critical catalyst "aging" step, the particular manipulative procedures that are actually utilized in carrying out the steps of the present processes are apparently not critical with respect to the successful practice of this invention. Generally, however, it is preferred that the temperature of the grafting blend be maintained at least as high as 30° F. while the cellulosic material in the vinyl-type compound react together. While the desired reaction apparently proceeds in practically any dilute acidic reaction medium, it is generally preferred that when ceric ions are utilized as one of the redox-type catalysts, nitric acid be used in an amount equal to between about 0.01 and about 1.0 molar concentration based on the aqueous portion of the grafting blend. Thus, the preferred pH range for the reaction medium is below about 2.0. Preferred concentrations of ceric ions are those within the range of from about 0.001 to about 0.1 molar, on the same aqueous basis.

The vinyl-type compounds that are preferred in the successful practice of the present processes are acrylonitrile, methyl methacrylate, methyl acrylate, ethyl acrylate, vinyl benzene (styrene), divinyl benzene, butyl methacrylate, butyl acrylate, vinyl acetate, acrylic acid, α-chloroacrylonitrile, acrylamide, ethyl methacrylate, and mixtures thereof. Of the cellulosic materials that can be used, regenerated cellulose, cellulose alkyl esters such as cellulose acetate, butyrate, propinate, cellulose acetate butyrate, and cellulose acetate propionate can be used, while the lower-alkyl cellulose esters are preferred. (In the grafting blends, it is also generally preferred that the weight ratio of the vinyl-type compound and the cellulosic material be at least about 0.5:1, respectively.)

In the following examples all parts given are by weight unless otherwise specified:

EXAMPLE I

A slurry or suspension is prepared by mixing together 25 parts of cellulose acetate (dry basis, containing 32 percent acetyl and 8.4 percent hydroxyl and which has been continuously maintained in the undried state after being precipitated conventionally with water from an acetic acid/water solution thereof) with 675 parts of water. Into this suspension are then blended 75 parts of an aqueous solution of ceric ion-nitric acid catalyst (which is 0.05 molar with respect to ceric ion and 0.5 molar with respect to nitric acid) which had been prepared (by simply dissolving 2.01 parts of ceric ammonium nitrate and 2.36 parts of 71 percent nitric acid into 70.63 parts of water) 6 hours before. Then, 37.5 parts of acrylonitrile are whipped into the suspension forming a uniform dispersion of the acrylonitrile through the dispersion. The temperature of the resulting grafting blend is then quickly adjusted to 77° F. and held at this point (while the reaction proceeds with stirring) for 5 minutes. Then the medium is filtered conventionally, the resulting filter cake is subsequently washed several times with water and subsequently dried. The resulting polymeric product contains 32.8 percent grafted poly(acrylonitrile), and is particularly useful as a heat and chemically resistant film having improved dimensional stability.

Essentially the same results can be obtained whether the catalyst is "aged" for 6, 8, 10 or even 1,000 hours. By comparison, catalyst "aged" for only 1 and 2 hours yielded 19.5 percent and 18.6 percent grafted poly(acrylonitrile), respectively.

EXAMPLE II

A wood cellulose pulp having a D.P. of 1,200 is slurried and stirred with water containing methyl methacrylate monomer for 30 minutes. Then a catalyst concentrate (0.05 molar in ceric ammonium nitrate and 0.5 molar in nitric acid that was prepared 6 hours before) is added to the slurry in an amount sufficient to yield a catalyst concentration in the resulting reaction medium of 0.005 molar in ceric ions and 0.05 molar in nitric acid. In the reaction medium, the cellulose to liquid ratio is then 1 to 50, and the cellulose to monomer ratio is 1 to 0.94 (both ratios based on the dry weight of the pulp).

The resulting blend is stirred for 6 hours at a temperature of 75° F. Then the product is filtered, washed several times with water, dried and weighed. The resulting product is found to contain 34.5 weight percent of grafted poly(methyl methacrylate). Similar processes in which differently aged catalyst is used yield widely varying products until after the catalyst has been aged to approximately its "maximum stable level." Data for several products made in this way (with variously "aged" catalyst) appears in the following table:

EFFECT OF CATALYST AGE *

| Catalyst Age (Hours) | % PMMA in Graft |
| --- | --- |
| 0 | 35.0 |
| 0.5 | 32.5 |
| 1.0 | 30.8 |
| 2.0 | 26.7 |
| 3.0 | 25.7 |
| 4.0 | 29.9 |
| 5.0 | 32.0 |
| 6.0 | 34.5 |
| 1,300 | 35.9 |

*On grafting reactivity of methyl methacrylate in pulp cellulose.

While in the foregoing examples, the ceric ion/nitric acid catalyst is initially prepared separately from the cellulosic and vinyl-type reactants, this entirely separate treatment is not required for the successful practice of this invention. What is required is the separation of the acidic catalyst system from the vinyl-type monomer for the necessary "aging" period. Thus, the catalyst could be intermixed, if desired, with the cellulosic material [in the essential absence of the vinyl-type compound(s)] at any time. The catalyst can even be initially prepared in the presence of the cellulosic material. Also a mixture of the cellulosic material and the vinyl-type monomer(s) can be prepared well in advance of the time the "aged" (stabilized) catalyst complex is blended therewith, if desired. Preferred vinyl compound usage in these processes is at least about 0.1 part of vinyl-type compound by weight, to every 5 parts of cellulosic raw material.

The invention has been described in detail with particular reference to preferred embodiments thereof, but it will be understood that variations and modifications can be effected within the spirit and scope of the invention.

We claim:

1. In a process for forming a grafted cellulosic product, which process comprises:
   a. initiating a grafting reaction by blending together to form a grafting blend in an acidic aqueous reaction medium (i) a cellulosic material selected from the group consisting of cellulose, cellulose esters, cellulose ethers and cellulose ether-esters (ii) a vinyl-type compound capable of being grafted to said cellulosic material in the presence of a redox catalyst and (iii) a ceric ion-nitric acid redox catalyst, and
   b. maintaining the temperature of said reaction medium sufficiently high and for a sufficient period of time for said cellulosic material and said vinyl-type compound to interact to thereby form said grafted cellulosic product; the improvement which comprises initiating said grafting reaction only after said ceric ion-nitric acid redox catalyst has been aged at a temperature of at least about 35° F. for a period of at least about 5 hours.

2. An improved process as in claim 1, wherein the amount of said ceric ion-nitric acid redox catalyst is sufficient to provide in said grafting blend a concentration of cerate ions equal to at least about 0.001 molar, and a concentration of nitrate ions equal to at least about 0.01 molar.

3. An improved process as in claim 2, wherein said ceric ion-nitric acid redox catalyst has been aged for at least about 5 hours before said grafting blend is prepared.

4. An improved process as in claim 3, wherein said cellulosic material contains at least about 1 percent hydroxyl.

5. An improved process as in claim 4, wherein said vinyl-type compound is selected from the group consisting of acrylonitrile, methyl methacrylate, methyl acrylate, ethyl acrylate, ethyl methacrylate, vinyl benzene, divinyl benzene, butyl methacrylate, butyl acrylate, vinyl acetate, acrylic acid, acrylamide and α-chloroacrylonitrile and mixtures thereof.

6. An improved process as in claim 2, wherein the weight ratio of said vinyl compound to said cellulosic material in said grafting blend is at least about 0.1 to 5.

7. An improved process as in claim 2, wherein said cellulosic material, water, and said ceric ion-nitric acid redox catalyst are blended together before said vinyl-type compound is intermixed with said cellulosic material.

8. An improved process as in claim 2, wherein a mixture of said cellulosic material, water and said vinyl-type compound is formed before said ceric ion-nitric acid catalyst is blended into said mixture.